United States Patent
Beazley et al.

(10) Patent No.: US 10,451,012 B2
(45) Date of Patent: Oct. 22, 2019

(54) GASEOUS FUEL COMBUSTION APPARATUS FOR AN INTERNAL COMBUSTION ENGINE

(71) Applicant: WESTPORT POWER INC., Vancouver (CA)

(72) Inventors: Roderick C. S. Beazley, Milford, MI (US); Philip C. Millward, Ann Arbor, MI (US); William D. Tenny, Novi, MI (US)

(73) Assignee: WESTPORT POWER INC., Vancouver (CA)

( * ) Notice: Subject to any disclaimer, the term of this patent is extended or adjusted under 35 U.S.C. 154(b) by 0 days.

(21) Appl. No.: 15/121,946

(22) PCT Filed: Feb. 20, 2015

(86) PCT No.: PCT/CA2015/050133
§ 371 (c)(1),
(2) Date: Aug. 26, 2016

(87) PCT Pub. No.: WO2015/127552
PCT Pub. Date: Sep. 3, 2015

(65) Prior Publication Data
US 2017/0067423 A1    Mar. 9, 2017

Related U.S. Application Data

(60) Provisional application No. 61/945,091, filed on Feb. 26, 2014.

(51) Int. Cl.
*F02M 35/10* (2006.01)
*F02B 43/00* (2006.01)
(Continued)

(52) U.S. Cl.
CPC ....... *F02M 35/10262* (2013.01); *F02B 43/00* (2013.01); *F02F 1/24* (2013.01);
(Continued)

(58) Field of Classification Search
CPC .................. F02M 35/10262; F02M 26/19
See application file for complete search history.

(56) References Cited

U.S. PATENT DOCUMENTS 1,818,283 A    8/1931   Spencer
3,110,293 A *  11/1963  Reiners ............... F02B 3/00
                                                    123/276
(Continued)

FOREIGN PATENT DOCUMENTS

CA    2 807 879 A1    2/2012
CN    1291257 A       4/2001
(Continued)

OTHER PUBLICATIONS

SweetHaven, Automotive Systems, 2004, SweetHaven Publishing, (http://www.waybuilder.net/sweethaven/MechTech/Automotive01/default.asp?unNum=2&lesNum=4&modNum=3).*
(Continued)

*Primary Examiner* — Xiao En Mo
(74) *Attorney, Agent, or Firm* — Seed Intellectual Property Law Group LLP (57) ABSTRACT

Diesel-cycle engines are known to have greater power, torque and efficiency compared to Otto-cycle engines of like displacement. When the fuel is a gaseous fuel, such as natural gas, a pilot fuel (such as diesel) is normally required to assist with ignition in a gaseous fuelled Diesel-cycle engine. It would be advantageous to reduce the power, torque and efficiency gap between a Diesel-cycle engine and a gaseous fuelled Otto-cycle engine. A combustion apparatus for a gaseous fuelled internal combustion engine comprises a combustion chamber defined by a cylinder bore, a cylinder head and a piston reciprocating within the cylinder bore. A diameter of the cylinder bore is at least 90 mm and a ratio between the diameter and a stroke length of the piston is at most 0.95. There is at least one intake passage for (Continued)

delivering a charge to the combustion chamber, and at least one intake valve is configured in the cylinder head and cooperates with the intake passage to create a predominant tumble flow motion in the combustion chamber.

20 Claims, 11 Drawing Sheets (51) Int. Cl.
| | |
|---|---|
| F02M 21/02 | (2006.01) |
| F02M 26/19 | (2016.01) |
| F02M 26/21 | (2016.01) |
| F02M 26/22 | (2016.01) |
| F02F 1/24 | (2006.01) |
| F02M 35/104 | (2006.01) |
| F02P 13/00 | (2006.01) |
| F02B 23/10 | (2006.01) |

(52) U.S. Cl.
CPC ........ *F02M 21/0212* (2013.01); *F02M 26/19* (2016.02); *F02M 26/21* (2016.02); *F02M 26/22* (2016.02); *F02M 35/104* (2013.01); *F02M 35/10216* (2013.01); *F02M 35/10255* (2013.01); *F02P 13/00* (2013.01); *F02B 2023/106* (2013.01); *Y02T 10/146* (2013.01); *Y02T 10/32* (2013.01)

(56) References Cited

U.S. PATENT DOCUMENTS

| | | | | |
|---|---|---|---|---|
| 4,162,662 | A * | 7/1979 | Melchior | F02B 25/145 123/65 VD |
| 5,553,580 | A * | 9/1996 | Ganoung | F02B 17/00 123/308 |
| 6,612,285 | B2 * | 9/2003 | Ganoung | F02B 17/00 123/308 |
| 6,860,252 | B1 * | 3/2005 | Ganoung | F02B 31/085 123/193.3 |
| 7,942,129 | B2 * | 5/2011 | Pagot | F02B 1/04 123/432 |
| 2001/0020463 | A1 * | 9/2001 | Wade | F01C 1/44 123/236 |
| 2005/0132984 | A1 * | 6/2005 | Fuerlinger | B64D 27/04 123/54.1 |
| 2005/0224060 | A1 | 10/2005 | Hill et al. | |
| 2008/0023262 | A1 | 1/2008 | Hayashi et al. | |
| 2010/0126170 | A1 | 5/2010 | Nishio et al. | |

FOREIGN PATENT DOCUMENTS

| | | | |
|---|---|---|---|
| CN | 1800604 A | 7/2006 | |
| CN | 204060993 U | 12/2014 | |
| DE | 10028047 A1 | 12/2001 | |
| EP | 1 043 485 A1 | 10/2000 | |
| EP | 1043485 A1 * | 10/2000 | ............. F02B 31/08 |
| GB | 1518 721 A | 7/1978 | |
| JP | 07-180559 A | 7/1995 | |
| JP | 2000-303910 A | 10/2000 | |
| JP | 2003-247444 A | 9/2003 | |
| JP | 2003-278569 A | 10/2003 | |
| JP | 3779269 B2 | 5/2006 | |
| JP | 2012-007522 A | 1/2012 | |
| JP | 2012-067679 A | 4/2012 | |
| JP | 2013-007270 A | 1/2013 | |
| JP | 2013-7270 A | 1/2013 | |
| JP | 2014-173523 A | 9/2014 | |
| RU | 2231658 C2 | 6/2004 | |
| SE | 9203900 C2 | 11/1997 | |
| WO | 2011/048610 A2 | 4/2011 | |
| WO | 2011/070395 A1 | 6/2011 | |

OTHER PUBLICATIONS

Larry Carley, "Perfect Engine Sealing Starts With Proper Head Bolt Use", Jul. 1, 2005, Enginebuildermag, (http://www.enginebuildermag.com/2005/07/perfect-engine-sealing-starts-with-proper-head-bolt-use/).*
International Search Report and Written Opinion of the International Searching Authority, dated May 5, 2015, for International Patent No. PCT/CA2015/050133, 15 pages.
Extended European Search Report, dated Sep. 15, 2017, for European Application No. 15755675.4-1616 / 3111073, 7 pages.
Chinese Search Report for CN 2015800108983, completed on May 22, 2018, 2 pages (translated).
Office Action, dated Apr. 9, 2019 for Japanese Application No. 2016-553597. 12 pages (translated).
Office Action, dated Apr. 11, 2019 for Chinese Application No. 201410085812.0, 14 pages (With English Translation).
Yang, "Internal Combustion Engine Design," China Agricultural Mechanical Press, 1981, 7 pages (With Concise Explanation of Relevance).
Office Action, dated Sep. 24, 2018 for Russian Application No. 2016135619/06, 8 pages (translated).
Office Action, dated Nov. 13, 2018 for Japanese Application No. 2016-553597, 11 pages (translated).
Office Action, dated Jan. 25, 2019 for Russian Application No. 2016135619, 9 pages (translated).

* cited by examiner

GASEOUS FUEL COMBUSTION APPARATUS FOR AN INTERNAL COMBUSTION ENGINE

FIELD OF THE INVENTION

The present application relates to a combustion apparatus for a gaseous fuelled internal combustion engine.

BACKGROUND OF THE INVENTION

Intake charge flow has a large impact on the performance of gaseous fuelled internal combustion engines. The mixing of air and possibly exhaust gases with gaseous fuel influences the quality of combustion inside the combustion chamber. The charge motion inside the combustion chamber during the intake stroke and later during the compression stroke determines the level and quality of mixing of the gaseous fuel. In some parts of the engine map a homogenous air-fuel charge may be desired, in other parts of the engine map a stratified fuel charge near an ignition device improves engine performance, and in still other parts of the engine map a locally rich and globally lean air-fuel mixture yields better performance. The production of high turbulence is an important factor for stabilizing the ignition process and for fast propagation of flame fronts (flame speed), especially in the case of lean-burn combustion. Two techniques for creating charge motion within cylinders are known as tumble motion and swirl motion. Tumble motion and swirl motion can be characterized by a dimensionless parameter employed to quantify rotational and angular motion inside the cylinder, which are known as tumble ratio and swirl ratio respectively. Both these values are calculated as the effective angular speed of in-cylinder air motion divided by the engine speed.

It is known to use tumble motion for a direct injection light duty gasoline engine employing fuel stratification around an ignition device. In tumble motion, which is also referred to as vertical swirl or barrel swirl, the rotation axis of the intake charge in the cylinder is orthogonal to the cylinder axis. In the context of this application a light duty engine is one having a cylinder bore diameter less than 90 millimeters (mm). Fuel stratification is an effective technique to extend lean burn limits in spark ignition engines and therefore gives an increased fuel economy, and exhaust emissions are reduced compared to previous gasoline light duty engines. Tumble motion can be effective in creating high levels of near-wall flow velocities even relatively late in the compression stroke, which can promote evaporation of a fuel wall film that is formed by an impinging fuel spray.

U.S. Pat. No. 5,553,580, issued Sep. 10, 1996 to Ganoung, discloses a high squish area barrel-stratified combustion chamber for gasoline engines employed to reduce brake specific fuel consumption for light duty engines. Two intake valves are in fluid communication with respective intake passages that are configured as tumble ports. A barrel-stratified charge is created in a cylinder by introducing gasoline into one of these intake passages such that a stratified barrel swirl forms in the vicinity of an asymmetrically located spark plug. The barrel swirl does not enhance burn rate, but rather promotes stratification of air-fuel charge in the cylinder at the time of ignition of the spark plug. A large squish area provides a fast burn rate by enhancing turbulence intensity during combustion.

It is known to use swirl motion for a diesel-cycle (compression ignition) heavy duty engine. In swirl motion the rotation axis of the intake charge in the cylinder is the cylinder axis. In the context of this application a heavy duty engine is one having a cylinder bore diameter greater than 120 millimeters (mm). Swirl motion has been shown to reduce particulate matter (PM) emissions from the engine. The trend for compression ignition engines is to employ higher injection pressures, which for liquid fuels improves droplet break-up, and for both liquid and gaseous fuels higher injection pressures improve air/fuel mixing in the spray and increases turbulent intensity in the combustion chamber. This is important, especially during transient conditions when the combustion system must handle lower air-fuel ratios conditions without producing high PM emissions. When swirl motion is employed the effects of PM production can be reduced under some transient conditions, even when high injection pressures are used. Converting an engine designed for swirl motion to tumble motion requires a different orientation for the intake passages and this requires a different cylinder head. The need for a new cylinder head is a deterrent to experimentation with this technology for medium duty engines and larger engines because diesel engines are already considered to be the most efficient internal combustion engines.

A goal of engine design is to downsize the displacement volume of cylinders without substantially losing performance (horsepower and torque). With increased fuelling costs and street congestion, vehicle operators are demanding more compact vehicles that provide the same overall performance as large vehicles but with improved fuel economy. Alternative gaseous fuels are increasingly finding new applications in automotive market segments dominated by gasoline and diesel fuelled engines in many jurisdictions. In light duty applications port injected natural gas engines have a long history in the aftermarket segment, and more recently OEM versions of these vehicles are being introduced. In heavy duty applications high pressure direct injection (HPDI) engine systems match the performance of diesel fuelled engines and with improved fuel economy compared to port injection natural gas engines.

There is a need for gaseous fuelled engines with comparable performance to larger engines but with improved fuel economy especially for engines designed at least for medium duty service.

SUMMARY OF THE INVENTION

An improved combustion apparatus for a gaseous fuelled internal combustion engine comprises a combustion chamber defined by a cylinder bore, a cylinder head and a piston reciprocating within the cylinder bore. A diameter of the cylinder bore is at least 90 mm and a ratio between the diameter and a stroke length of the piston is at most 0.95. There is at least one intake passage for delivering a charge to the combustion chamber, and at least one intake valve is configured in the cylinder head and cooperates with the intake passage to create a predominant tumble flow motion in the combustion chamber.

In preferred embodiments, the ratio is at least 0.75 and/or the diameter is less than or equal to 120 mm. The swept volume of the cylinder bore is preferably between a range of 0.8 liters and 2.5 liters. An injection valve can be configured to introduce gaseous fuel upstream from the at least one intake valve. Alternatively, the injection valve can be disposed in the combustion chamber to directly introduce gaseous fuel therein. An ignition device can be disposed in the combustion chamber to assist with ignition of gaseous fuel and the charge. In a preferred embodiment the ignition device is a spark plug. Preferably, the tumble flow motion comprises an average tumble ratio between a range of 2 and 5. The internal combustion engine has a maximum engine speed of 2700 revolutions per minute. Each intake valve comprises a valve member and a valve seat. The valve seat comprises a valve seat angle between 25° and 35°. In a preferred embodiment the valve seat angle is substantially 30°. A difference between the valve seat angle and a port angle is between a range of −5° and 5°. A compression ratio of the internal combustion engine is at least 11 to 1, and in a preferred embodiment is at most 15 to 1. An intake manifold comprises a first distribution chamber in fluid communication with an air intake of the internal combustion engine, a second distribution chamber in fluid communication with the at least one intake passage; and a diffuser fluidly connecting the first and second distribution chambers. The combustion apparatus can comprise an EGR valve for selectively supplying exhaust gases to the intake manifold. In a preferred embodiment the exhaust gases are cooled before being delivered to the intake manifold. A throttle valve can be employed for variably supplying air to the intake manifold. In preferred embodiments the throttle valve is commanded to maintain a stoichiometric gaseous fuel-air mixture within a predetermined tolerance.

In a preferred embodiment, the at least one intake passage is a first intake passage and a second intake passage and the at least one intake valve is a first intake valve and a second intake valve. The combustion apparatus further comprises a flow divider in fluid communication with the injection valve to receive gaseous fuel and with the first and second intake passages to deliver gaseous fuel received from the injection valve. The flow divider comprises a body having a bore and a pair of conduits. The bore is in fluid communication with the injection valve and each conduit is in fluid communication with the bore and with a respective one of the first and second intake passages.

The internal combustion engine comprises an engine block and an intake manifold, and the at least one intake passage is a first intake passage and a second intake passage. In another preferred embodiment, the combustion apparatus further comprises six bolts arranged around the cylinder bore for retaining the cylinder head to the engine block. The first and second intake passages extend from the intake manifold along respective sides of one of the bolts towards the combustion chamber.

A new gaseous fuel flow divider for dividing a gaseous fuel flow from a fuel injection valve comprises a body portion comprising a bore in fluid communication with the fuel injection valve; and first and second conduits in fluid communication with the bore. The gaseous fuel flow is divided into first and second streams in the first and second conduits respectively. In a preferred embodiment, the fuel injection valve is part of a fuel injector, and the bore is configured to receive a nozzle of the fuel injector. In other preferred embodiments, the first and second conduits are substantially orthogonal to a longitudinal axis of the bore, and/or the body and the first and second conduits are an integrated component.

An improved intake manifold for a gaseous fuelled internal combustion engine comprises a first distribution chamber in fluid communication with an air intake of the internal combustion engine; a second distribution chamber in fluid communication with at least one intake passage for each combustion chamber of the internal combustion engine; and a diffuser fluidly connecting the first and second distribution chambers. The first distribution chamber can comprise a medially located inlet, and an outer contour of the first distribution chamber can taper towards the diffuser on both sides of the inlet. The diffuser comprises a slot comprising a reduced flow area compared to the first distribution chamber. In a preferred embodiment, the second distribution chamber is in fluid communication with two intake passages for each combustion chamber.

An improved arrangement for an intake port and a valve seat for a gaseous fuelled internal combustion engine comprises a difference between a port floor angle and a valve seat angle between a range of −5° and +5°. The valve seat angle is between a range of 25° and 35°, and in a preferred embodiment the valve seat angle is substantially 30°. When a valve member associated with the valve seat is in an opened position a flow in the intake port is substantially biased towards a top side of the valve member.

An improved gaseous fuelled internal combustion engine comprises a cylinder head, an engine block comprising a cylinder bore, and a piston associated with the cylinder bore. The piston, the cylinder bore and the cylinder head define a combustion chamber. A first set of six bolts are arranged around the cylinder bore for retaining the cylinder head to the engine block, and preferably in a hexagon pattern. First and second intake passages extend from an intake manifold along respective sides of one of the bolts towards the combustion chamber. In a preferred embodiment there is a second cylinder bore and a second set of six bolts arranged around the second cylinder bore. A pair of bolts are common to the first and second sets of bolts.

DETAILED DESCRIPTION OF PREFERRED EMBODIMENT(S)

Figure 1:
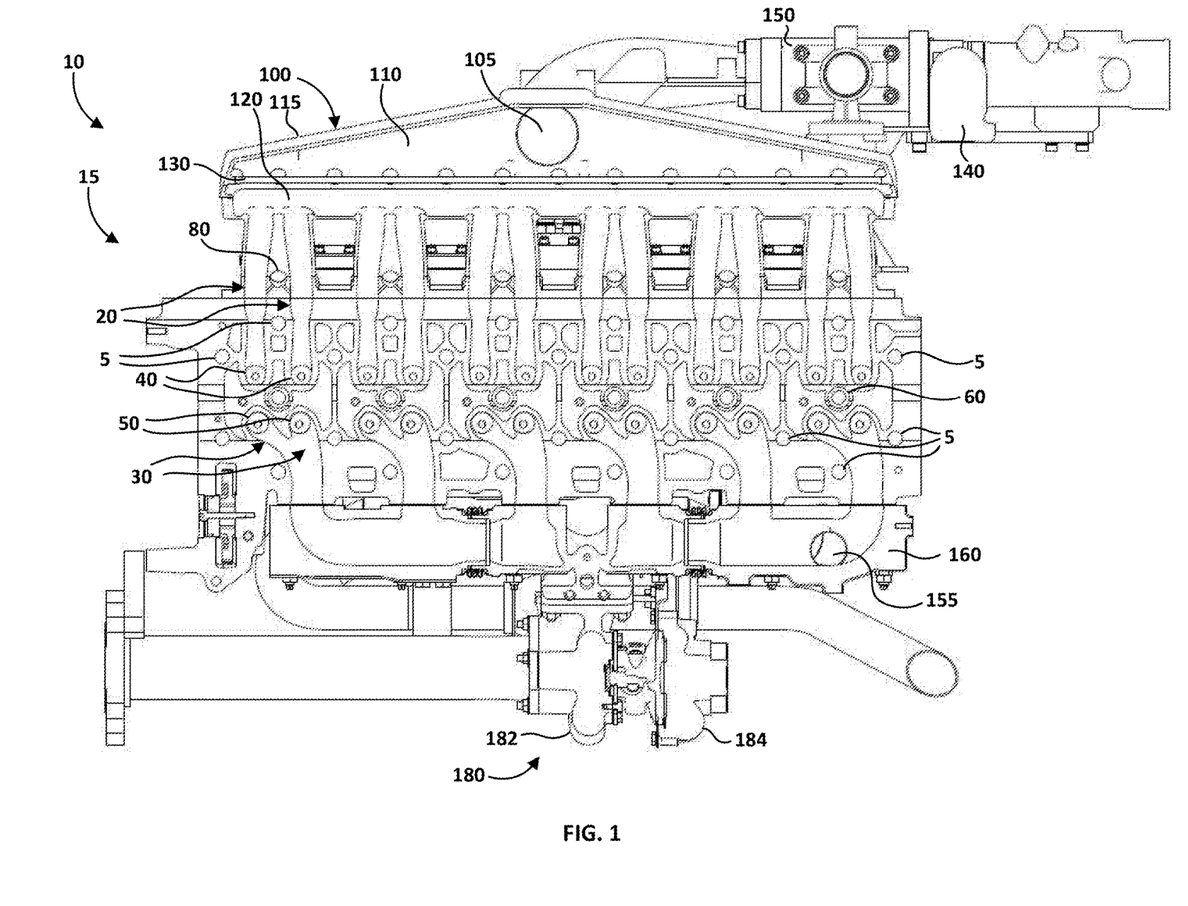
FIG. 1 is a partial cross-sectional plan view of an internal combustion engine comprising a gaseous fuel combustion apparatus according to a first embodiment.
Figure 2:
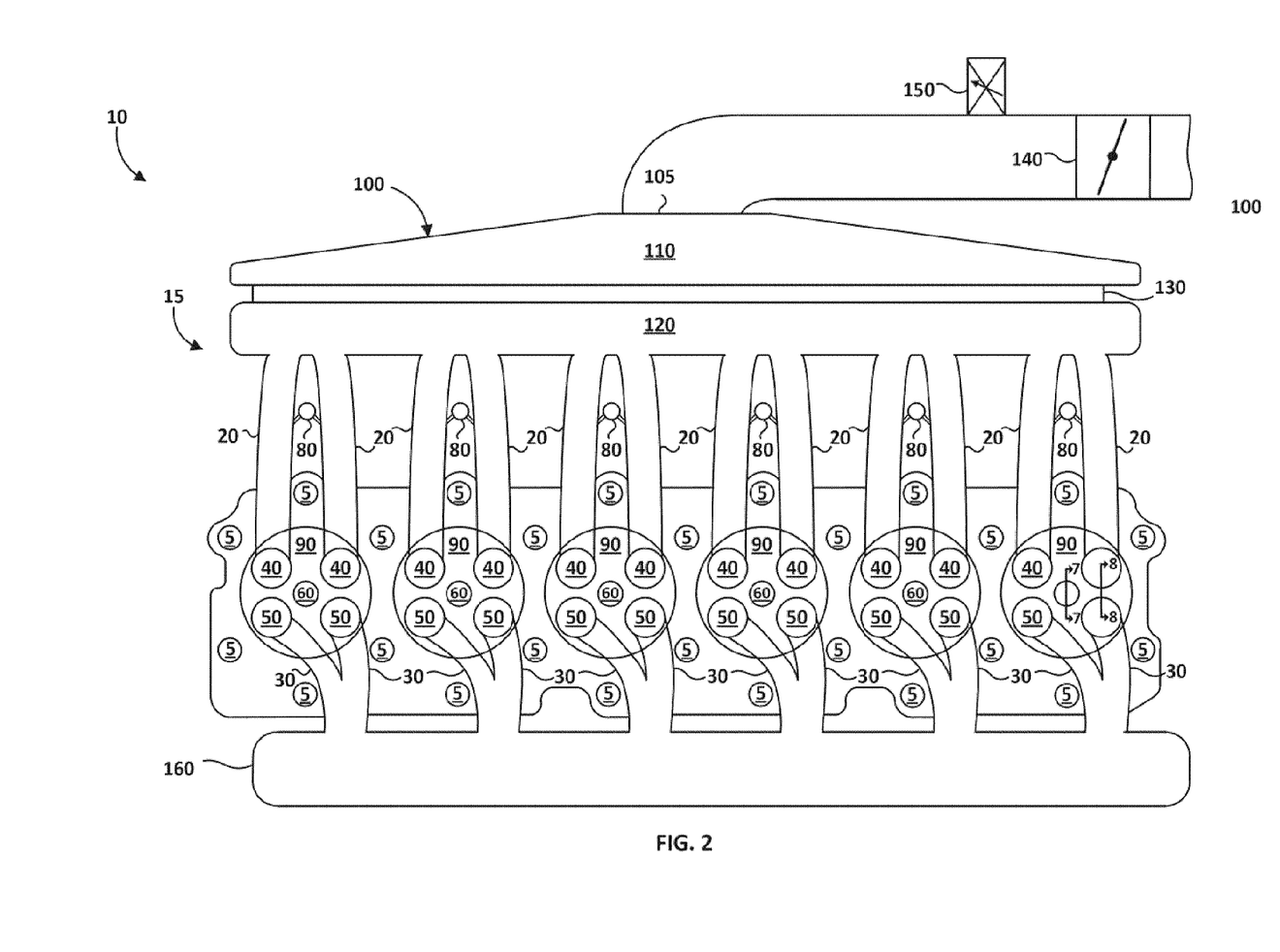
FIG. 2 is a schematic plan view of the internal combustion engine of FIG. 1.

Referring to the figures and first to FIGS. 1 and 2, engine 10 comprising gaseous fuel combustion apparatus 15 is shown according to a first embodiment. Intake manifold 100 comprises first distribution chamber 110 and second distribution chamber 120, also known as plenums, fluidly connected with each other through diffuser 130. First distribution chamber 110 is in fluid communication with throttle 140 to receive an air charge from an air intake of engine 10, and when engine 10 employs exhaust gas recirculation, EGR valve 150 is operable to admit exhaust gases into the intake air stream. A pair of intake passages 20 extend along respective sides of one cylinder head bolt 5 and fluidly connect second distribution chamber 120 with respective intake valves 40 for each cylinder 90. Each intake passage 20 comprises intake runner 22 connected with second distribution chamber 120 and intake port 24 in cylinder head 240 (best seen in FIG. 8). Although six cylinders are shown in the illustrated embodiment, there can be one or more cylinders in other embodiments. As is typical with medium duty or larger engines, cylinder head bolts 5 are arranged in a hexagon pattern around each cylinder 90 such that two of the bolts are shared between adjacent cylinders. Exhaust passages 30 extend from exhaust valves 50 and merge into a unified exhaust passage leading to exhaust manifold 160 in the illustrated embodiment, although other configurations are possible without departing from the spirit of the disclosed developments. Each exhaust passage comprises exhaust runner 32 and exhaust port 34 in cylinder head 240 (best seen in FIG. 8).

Figure 3:
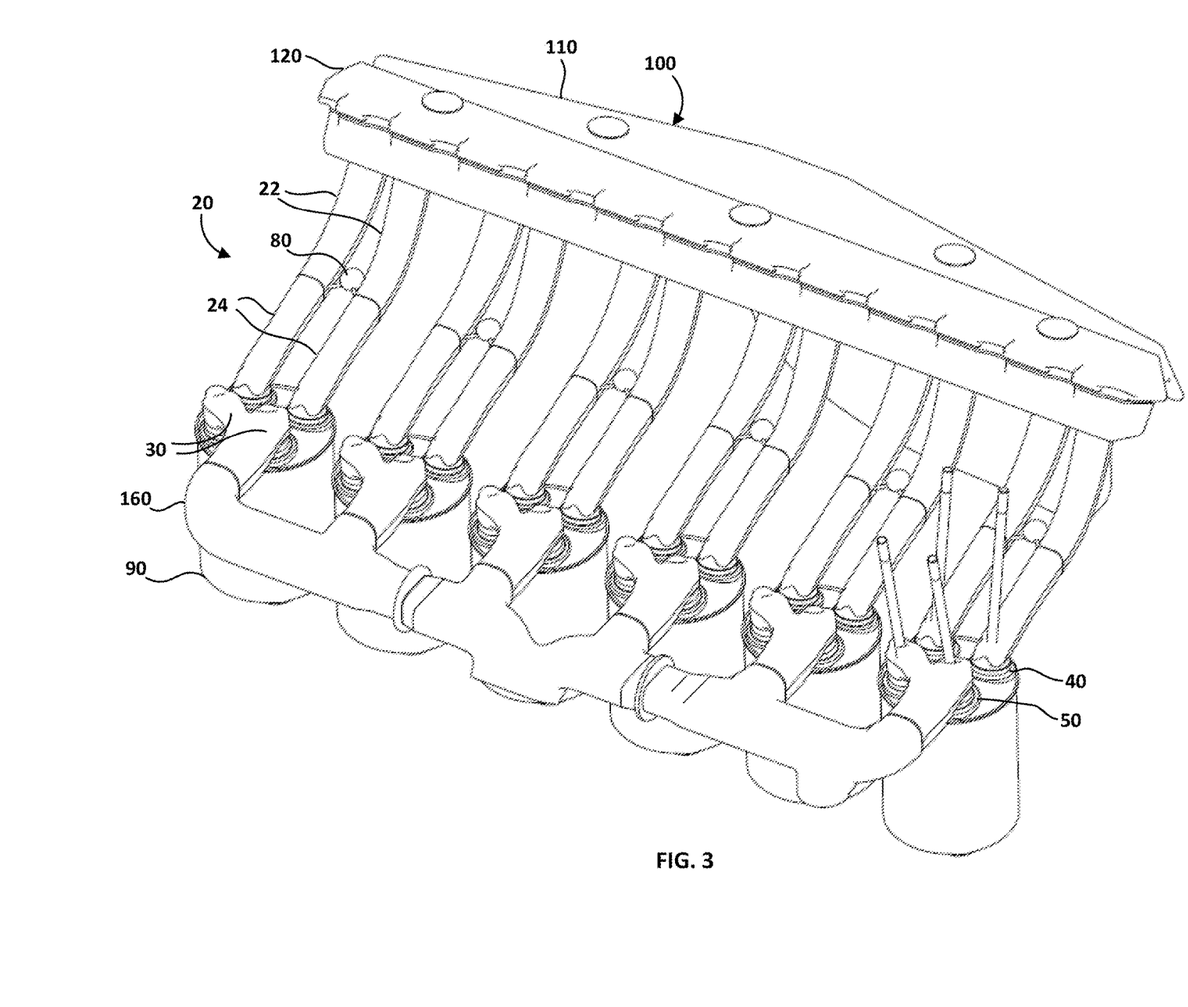
FIG. 3 is a perspective view of an intake manifold, an exhaust manifold, a plurality of cylinders and respective intake passages and exhaust passages of the internal combustion engine of FIG. 1.
Figure 4:
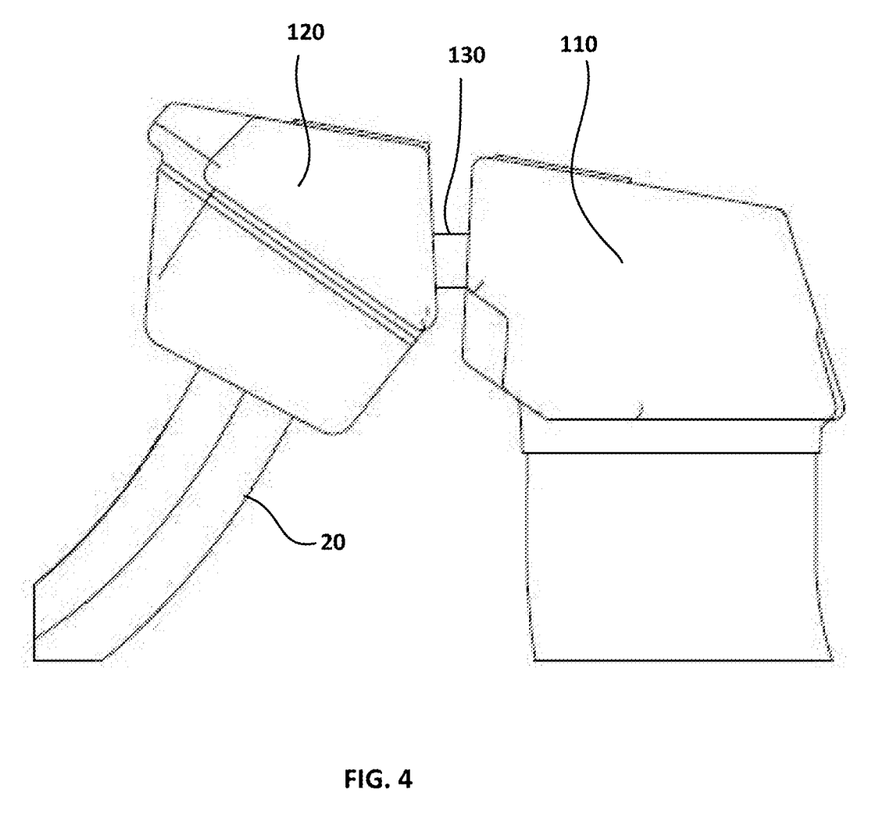
FIG. 4 is an elevation view of the intake manifold of FIG. 3.

Intake manifold 100 is designed with features that improve the equalization of air (and EGR) charge distribution to each cylinder 90 by causing the flow to enter second distribution chamber 120 from first distribution chamber 110 through diffuser 130. Outer contour 115 of first distribution chamber 110 extends towards diffuser 130 on either side of medially located inlet 105 to improve the pressure balance of the charge along first distribution chamber 110 prior to entering second distribution chamber 120. Diffuser 130 is in the form of a slot extending along first and second distribution chambers 110 and 120. Due to a reduced flow area across diffuser 130 the charge flow is restricted causing flow impingement onto the walls of first distribution chamber 110 generating turbulence and overall pressure increase in and pressure balance along the first distribution chamber. The resulting turbulence in first distribution chamber 110 improves air-EGR mixing.

Figure 5:
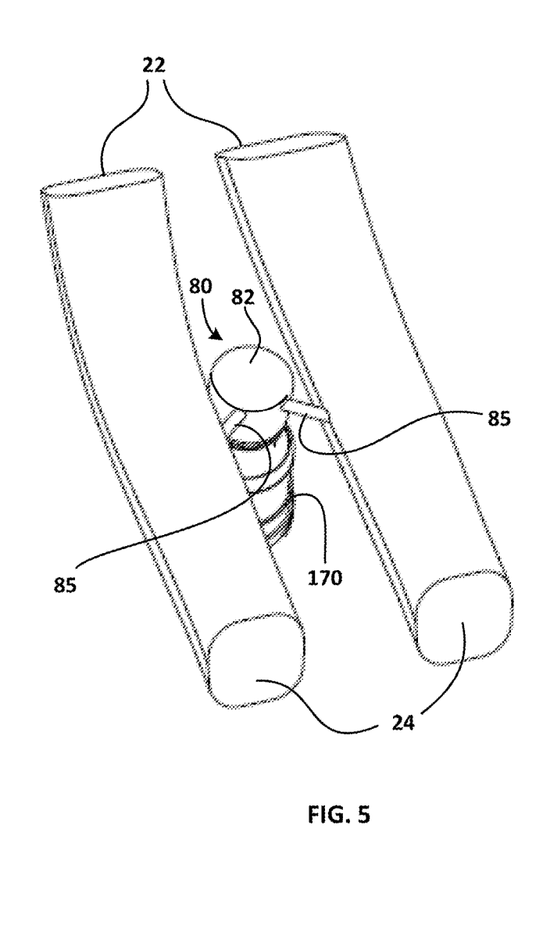
FIG. 5 is a perspective view of a gaseous fuel flow divider fluidly connecting one injection valve with two intake passages.
Figure 6:
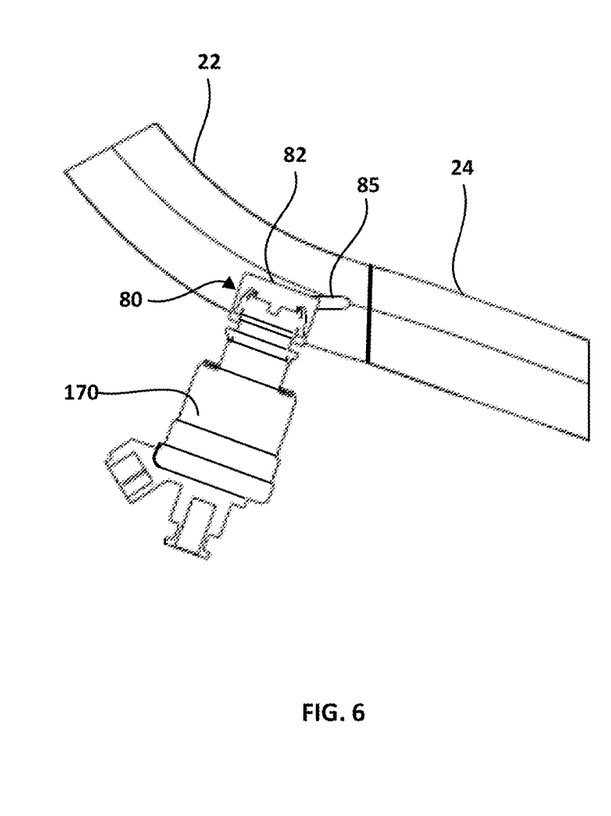
FIG. 6 is a partial cross-sectional view of the flow divider of FIG. 5.

Referring now to FIGS. 5 and 6, flow dividers 80 fluidly connect a respective gaseous fuel injector 170 (shown in FIGS. 5 through 8) with respective intake passages 20 through conduits 85, allowing one fuel injector to simultaneously introduce gaseous fuel into the pair of intake passages for each respective cylinder 90. Flow dividers 80 comprise body 82 comprising a bore in which a nozzle of fuel injector 170 inserts. The bore also acts as a plenum and accumulator for gaseous fuel received from fuel injector 170 that impinges an end of bore and builds up pressure, exiting through conduits 85 into respective intake passages 20. In a preferred embodiment, conduits 85 are substantially orthogonal to a longitudinal axis of the bore of body 82. In the illustrated embodiment flow divider 80 is an integrated component, although in other embodiments flow divider 80 can be an assembly of components and in these embodiments there can be additional components such as seals. Gaseous fuel injectors 170 are fluidly connected with a source of gaseous fuel (not shown) and introduce the gaseous fuel when commanded into flow divider 80 such that a gaseous fuel-air mixture flows into cylinder 90 though associated intake valves 40. Within this disclosure reference is made to a gaseous fuel-air mixture, which is understood to also refer to a gaseous fuel-air-EGR mixture depending upon the operating conditions and requirements of engine 10. The source of gaseous fuel supplies gaseous fuel at a pressure suitable for port injection. In a preferred embodiment the source of gaseous fuel stores gaseous fuel as compressed natural gas and employs a pressure regulator to reduce the storage pressure to a predetermined port injection pressure. A gaseous fuel is any fuel that is in a gas state at standard temperature and pressure, which in the context of this application is 20 degrees Celsius (° C.) and 1 atmosphere (atm). An exemplary gaseous fuel is natural gas.

Figure 7:
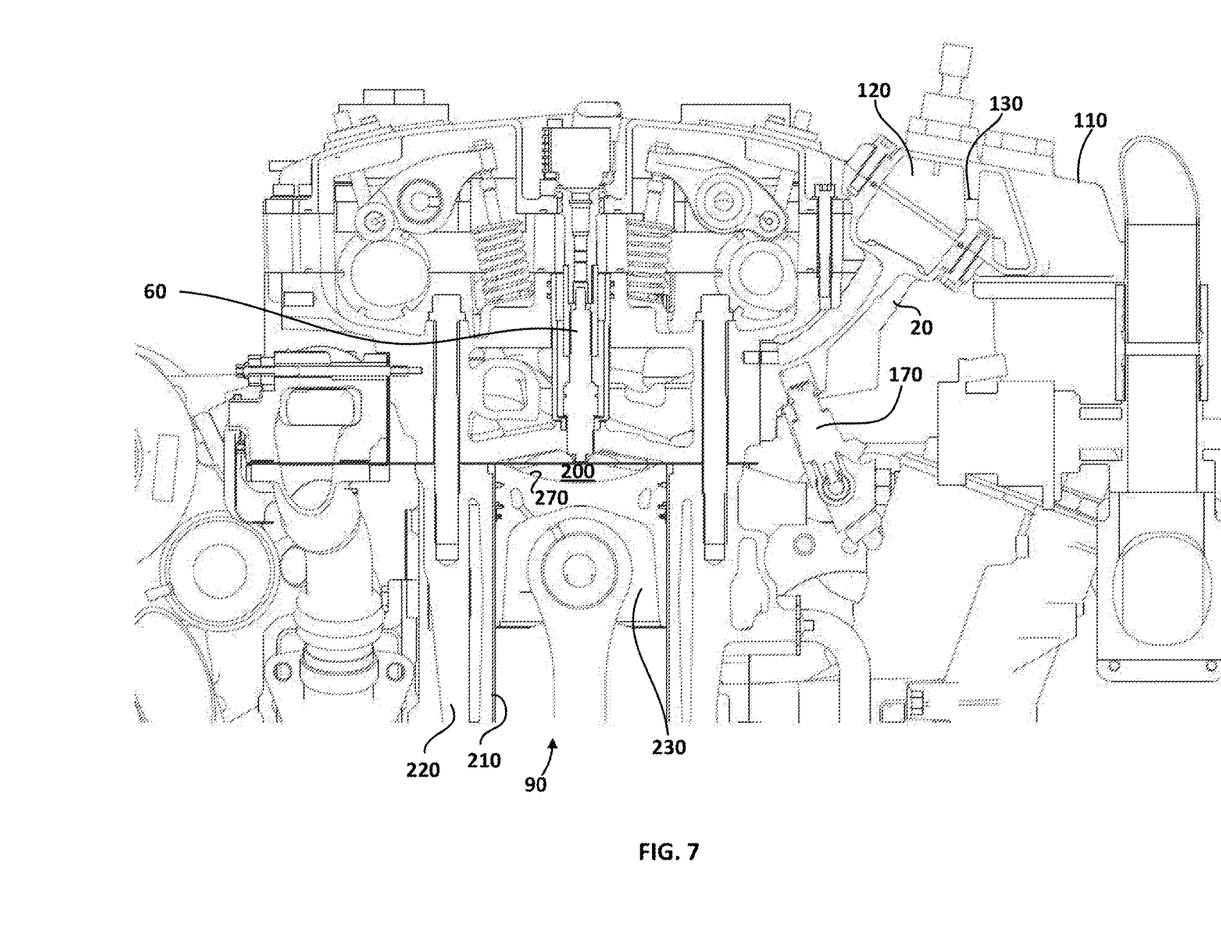
FIG. 7 is a cross-sectional view taken along line 7-7 in FIG. 2.

Each cylinder 90 comprises a mechanism for igniting the gaseous fuel-air mixture therein. In the illustrated embodiment this mechanism is provided by ignition device 60. In preferred embodiments, the positive ignition device is a spark plug (as shown in FIG. 7). With reference again to FIG. 1, in the illustrated embodiment, boosting apparatus 180 for pressurizing intake air is a turbocharger comprising turbine 182 and compressor 184. An outlet of compressor 184 is fluidly connected with the air intake of engine 10. In alternative embodiments boosting apparatus 180 can comprise sequential turbochargers, or can be in the form of a supercharger, or combinations of turbochargers and superchargers. Exhaust manifold 160 comprises an EGR port 155 in fluid communication with EGR valve 150. In another embodiment, the exhaust manifold and EGR apparatus can be like that which is disclosed in the applicant's co-owned U.S. provisional patent application Ser. No. 61/870,203, which is hereby incorporated by reference herein in its entirety.

Figure 8:
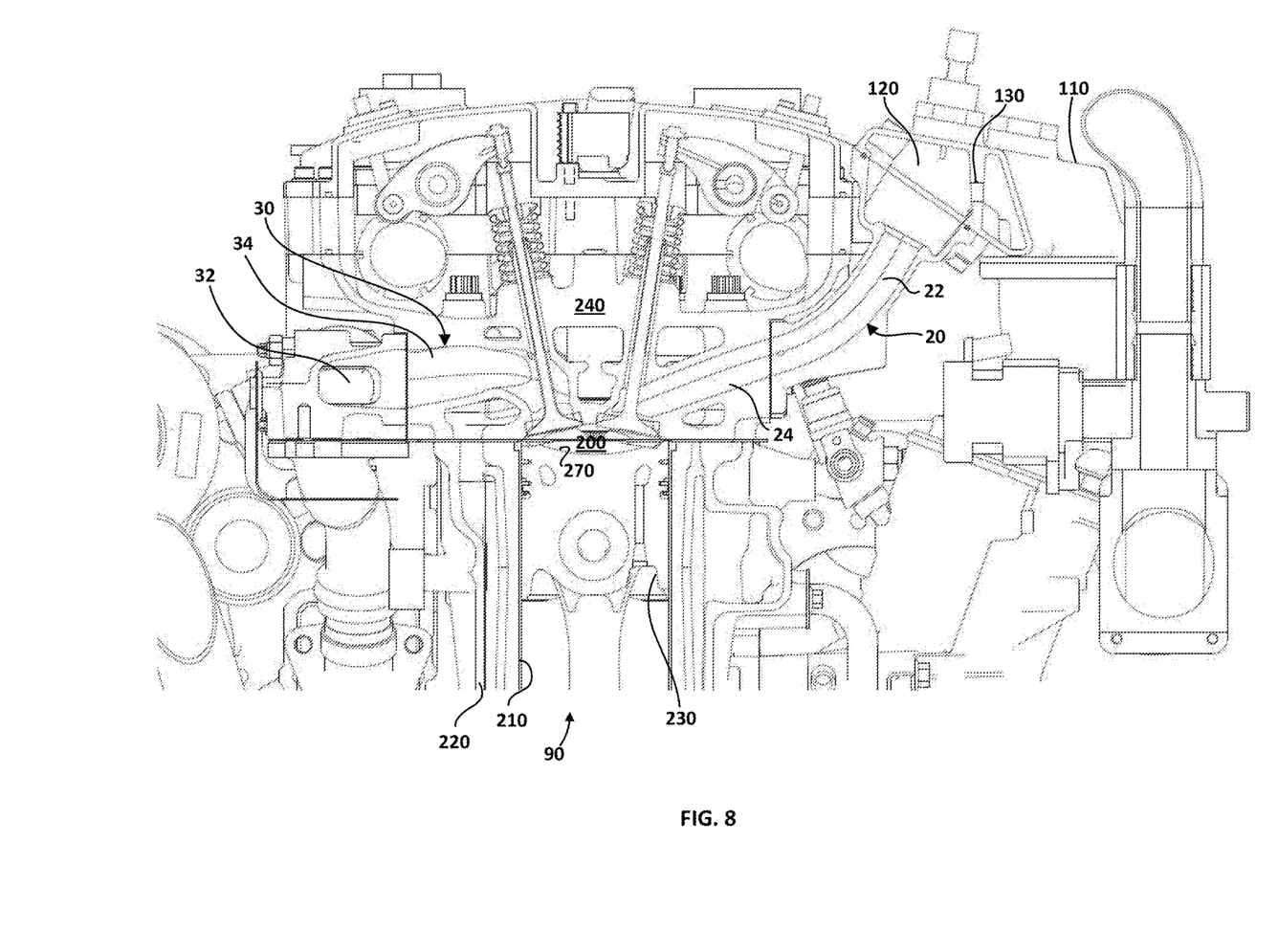
FIG. 8 is cross-sectional view taken along line 8-8 in FIG. 2.
Figure 9:
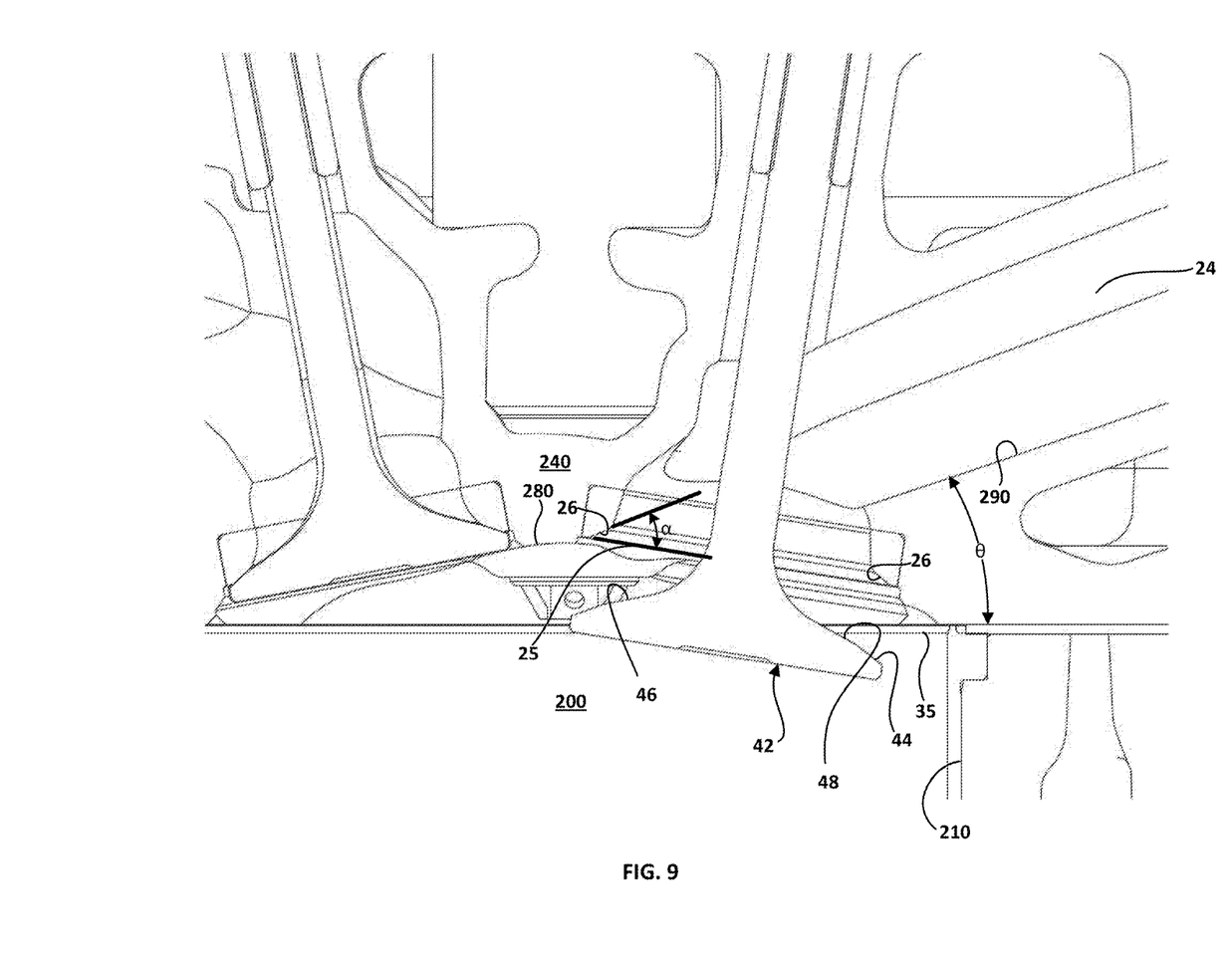
FIG. 9 is an exploded view of FIG. 8 illustrating an intake valve fully open.

Referring now to FIGS. 8 and 9, each cylinder 90 comprises a respective combustion chamber 200 defined by a respective cylinder bore 210 in engine block 220, a respective piston 230 and cylinder head 240. With reference to FIG. 9, each intake valve 40 comprises respective valve members 42 and respective valve seats 26 that extend annularly around an opening of intake port 24 through which the intake charge flows into combustion chamber 200. Annular surface 44 on the back side of each valve member 42 mutually engages valve seat 26 to fluidly seal combustion chamber 200 from respective intake passages 20 when respective intake valves 40 are closed. Valve seat angle α is defined as the angle between port opening plane 25 and valve seat. In a preferred embodiment valve seat angle α is within a range of 20 degrees (°) to 35°, and preferably it is 30°. This valve seat angle range enhances tumble motion, as will be explained below in more detail, and reduces valve seat wear leading to increased durability. To facilitate the tumble motion with combustion chamber 200, cylinder head 240 comprises pent-roof 280 over cylinder bore 210 and piston bowl 270 is generally concave in shape. The inclination of pent-roof 280 is similar to the curvature of piston bowl 270 such that when piston 230 is at top dead center (TDC) combustion chamber 230 is substantially symmetrical in shape.

Engine 10 is a medium duty engine. In the context of this disclosure, the diameter of cylinder bore 210 is defined to be within a range of 90 mm and 120 mm for a medium duty engine. In alternative embodiments, the diameter of cylinder bore 210 can be greater than 120 mm, such as for heavy duty engines and even larger engines such as those used in locomotive, mine haul and marine applications. In preferred embodiments it has been determined that a ratio between the diameter of cylinder bore 210 and the length of strokes of piston 230 (bore to stroke ratio) within a range of 0.75 and 0.95 provides a surprising increase in power density while not sacrificing efficiency. In fact, efficiency has been increased by reducing heat transfer from combustion gases to cylinder bore 210 thereby increasing the energy transfer to a crankshaft of engine 10. The volume swept by each piston 230 in respective cylinder bores 210 is within a range of 0.8 liters and 2.5 liters. Different from light duty engines that use tumble motion, the maximum engine speed of engine 10 is 2700 revolutions per minute (rpm) in all operating modes.

Figure 10:
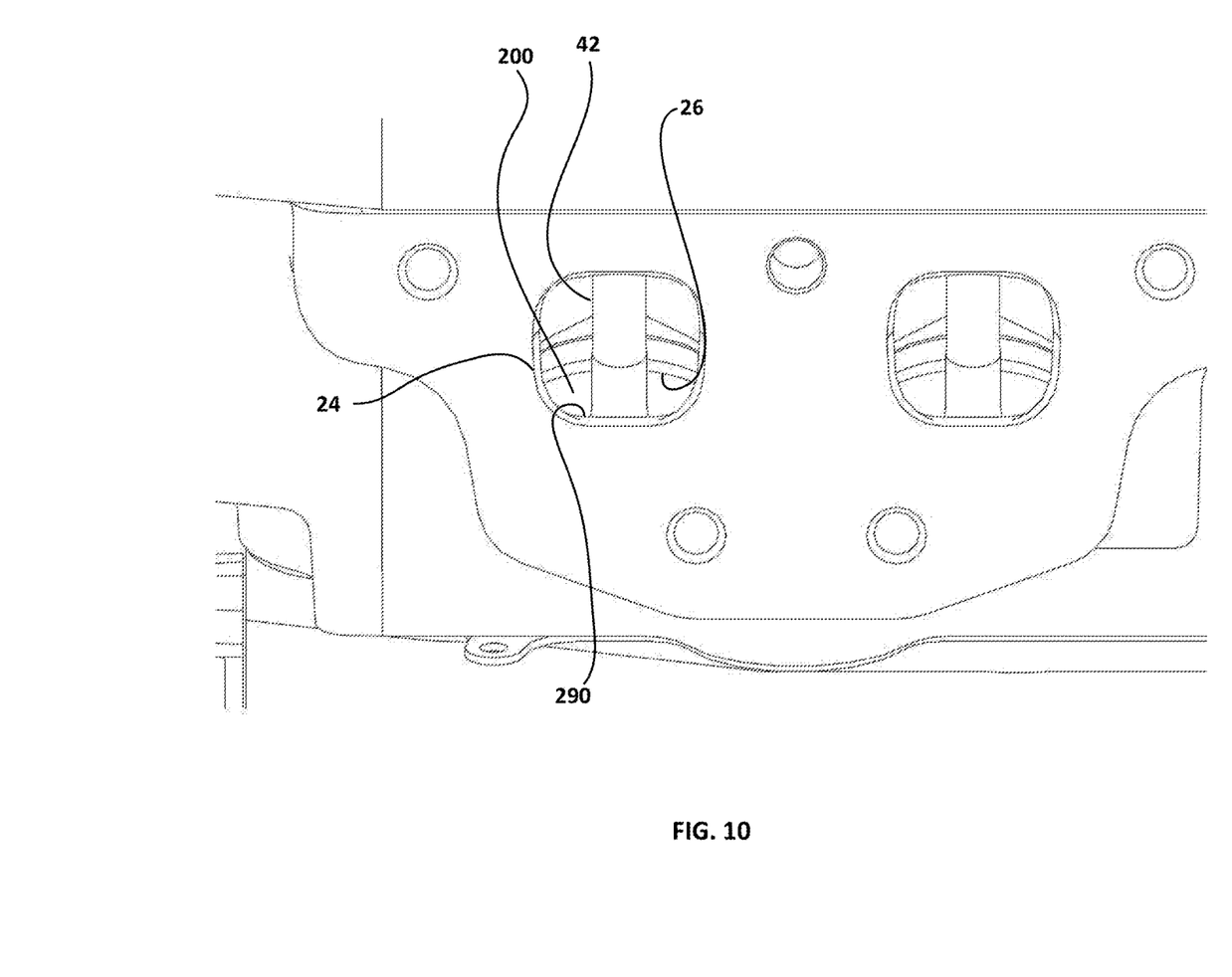
FIG. 10 is a cross-sectional view taken across a transverse plane of an intake port of FIG. 9 looking into a combustion chamber.

For each cylinder 90, the pair of intake passages 20, respective intake valves 40 and combustion chamber 200 cooperate to establish a tumble motion of the air-fuel mixture in the combustion chamber. In a preferred embodiment the average tumble ratio is at least 2. In another preferred embodiment the average tumble ratio is within a range of 2 to 5. When valve member 42 is at maximum lift, as illustrated in FIG. 9, flow (air, EGR, gaseous fuel) along port floor 290 is heavily biased towards top side 46 of valve member 42 such that a counter-clockwise tumble motion is created in combustion chamber 200 for the illustrated embodiment. Any flow under low side 48 of valve member 42 creates a clockwise tumble motion in combustion chamber 200, which acts in opposition to the counter-clockwise tumble motion established by flow over top side 48. To reduce tumble motion in the clockwise direction in combustion chamber 200, port floor 290 of intake ports 24 is deliberately spaced apart from low side 48 of valve member 42 when in the seated position such that flow substantially goes over top side 46 of valve member 42 when in the open position. Port angle θ of intake ports 24, which is defined as the angle between port floor 290 and transverse cylinder plane 35, is equal to valve seat angle α within a predetermined range of tolerance to reduce and preferably minimize disparity and sudden changes in flow direction as air enters combustion chamber 200, improving intake port quality. In a preferred embodiment the difference between port angle θ and valve seat angle α is less than +/−5°. Changes in flow direction create pressure drops that act as road blocks in the way of flow. With reference to FIG. 10, there is shown a cross-sectional view of intake port 24 taken along a transverse plane of the intake port and looking into combustion chamber 200 with valve member 42 fully open. This view illustrates the strong bias of flow over top side 46 of valve member 42 for tumble motion generation within combustion chamber 200. The cross-sectional profile of valve port 24 is generally square with rounded corners. Port angle θ, valve seat angle α and the shape of intake ports 24 are in sympathy with each other to enhance the tumble motion of the gaseous fuel-air mixture in combustion chamber 200.

The turbulent kinetic energy of the gaseous fuel-air mixture is increased as the resulting tumble motion inside combustion chamber 200 is compressed, compared to swirl air motion combustion chambers and quiescent combustion chambers, improving breakdown into turbulent kinetic energy. The turbulent flame speed of the mixture is increased as well as local laminar flame fronts within the turbulent mixture. Due to the increased flame speeds the knock limit is increased, and efficiency can consequently be improved by employing higher compression ratios. A compression ratio range between 11 to 1 (11:1) and 15 to 1 (15:1) is preferred. Operating engine 10 with cooled EGR at higher EGR rates reduces the likelihood of knock, and increases the ratio of specific heats of the working gas improving Otto efficiency. Compression ratios higher than approximately 15 to 1 exhibit diminishing returns where the heat loss in compression is greater than what can be returned through expansion. Compression ignition engines employ compression ratios greater than 15 to 1 to improve cold start performance, and this is not required for spark ignited engines. With smaller compression ratios compared to compression ignition engines, the piston and bearing sizes can be reduced which consequently reduces the friction leading to improved efficiency.

Figure 11:
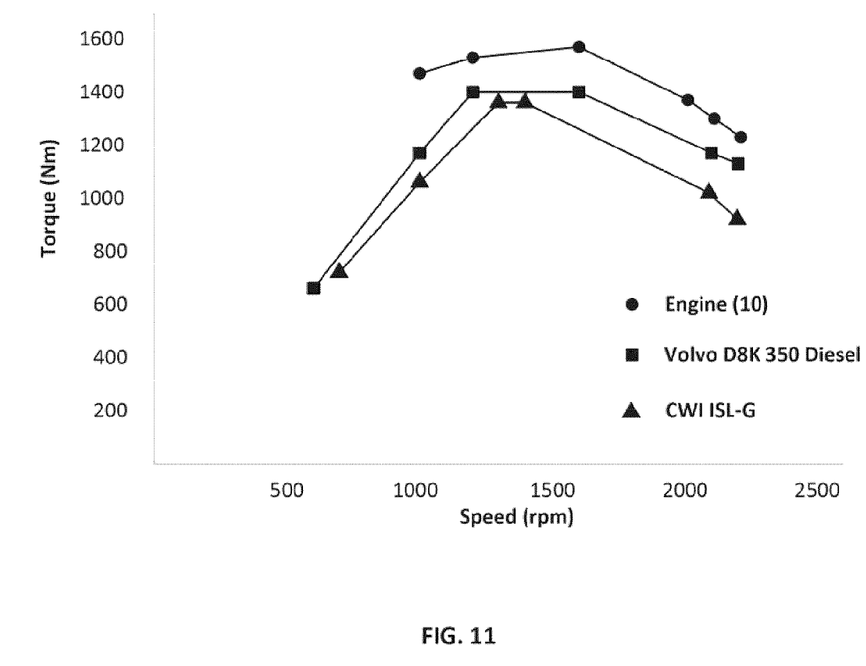
FIG. 11 is a chart view of torque curves for a Volvo D8K 350 Diesel compression ignition engine comprising a compression ratio of 17.5 to 1 and the internal combustion engine of FIG. 1 comprising a compression ratio of 12 to 1, where both engines have displacements of 7.7 liters, and a CWI ISL-G spark ignited natural gas engine having a displacement of 8.9 liters.

The engine of the illustrated embodiment was operated in a test cell fuelled with natural gas at a compression ratio of 12 to 1 and the torque data was recorded for a range of engine speeds. The chart of FIG. 11 illustrates the recorded data contrasted with the torque curve for a Volvo D8K 350 Diesel compression ignition engine of like displacement (7.7 liters) but with a compression ratio of 17.5 to 1, and a CWI ISL-G spark ignited natural gas engine with a displacement of 8.9 liters. It is surprising to see that the engine of the present embodiment outperformed the other spark ignited natural gas engine (ISL-G) of considerably larger displacement. Normally, it would be expected that a diesel engine with a higher compression ratio would yield higher performance and efficiency. As the curves illustrate, the torque for the engine of the illustrated embodiment outperformed the diesel engine of greater compression ratio over the range of tested engine speeds. The Volvo D8K 350 Diesel compression ignition engine (diesel engine hereafter) operates in a lean combustion mode, whereas engine 10 operates at or near a stoichiometric air-fuel ratio. The operation of the diesel engine is different compared to engine 10 in that it has to run with an excess of air to avoid smoke. The turbocharger of the diesel engine then has to be significantly larger compared to boosting apparatus 180 to deliver the required excess air for the same power and torque as the stoichiometric engine 10 that delivers (substantially) just enough air for the power and torque. As a result, boosting apparatus 180 can employ a much smaller turbocharger compared to the diesel engine, which can then spool up quicker to produce the lower amount of boost required by engine 10 (relative to the diesel engine). The engine speed of engine 10 is kept below 2700 rpm in all operating modes. By operating at reduced engine speeds fuel economy is improved by reducing energy lost to friction. Boosting apparatus 180 compensates for the slower engine speed by increasing the pressure in intake manifold 100 thereby increasing oxygen available for combustion within combustion chamber 200 for each firing event.

Figure 12:
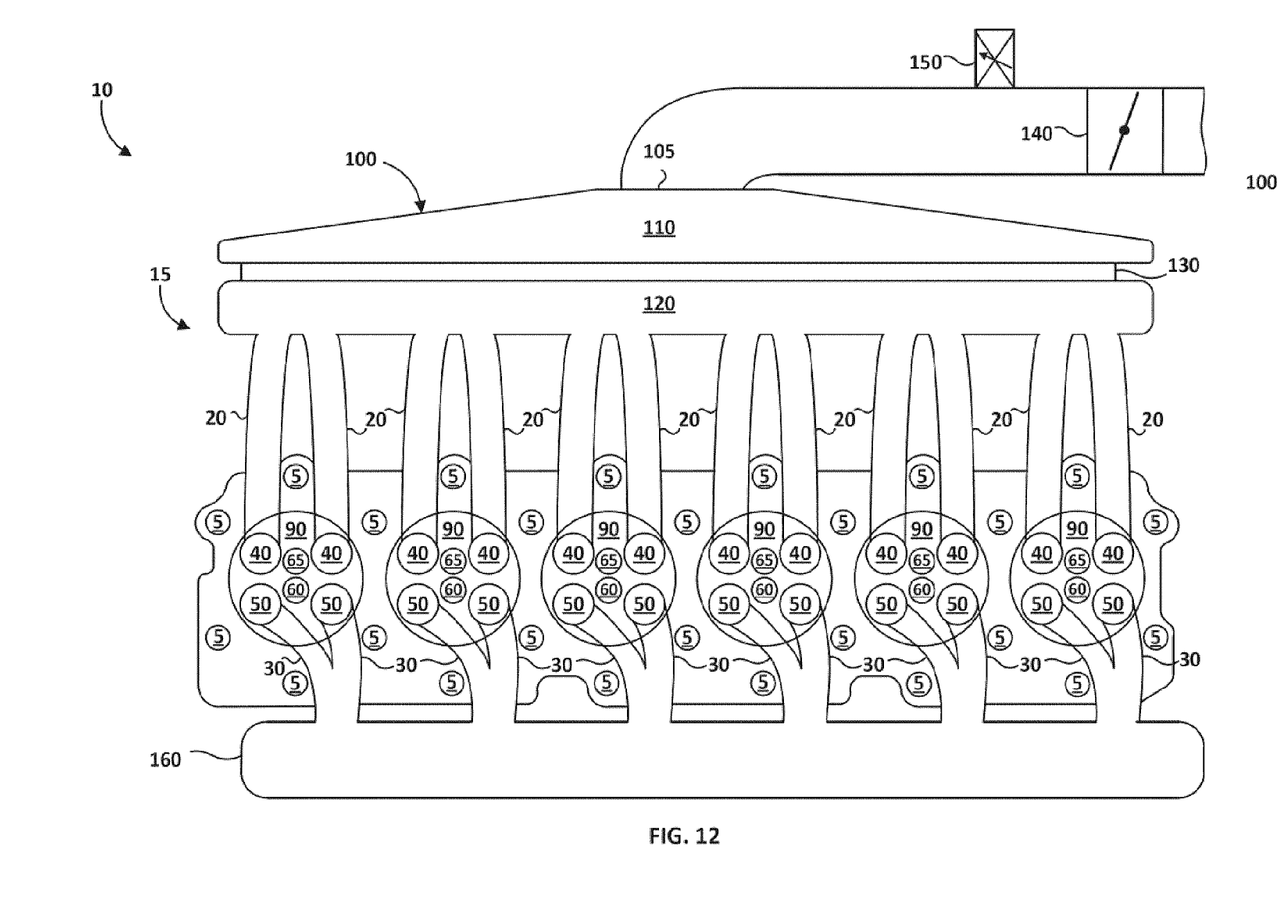
FIG. 12 is a schematic view of an internal combustion engine comprising a gaseous fuel combustion apparatus according to a second embodiment.

Referring now to FIG. 12, engine 11 comprising gaseous fuel combustion apparatus 21 is shown according to a second embodiment that is similar to the first embodiment where like parts have like reference numerals and will not be described in detail if at all. Direct injectors 65 introduce gaseous fuel directly into combustion chamber 200 such that flow divider 80 is not required. Direct injectors 65 can be configured centrally in respective cylinders 90 or can be offset towards intake valves 40. Alternatively, direct injectors 65 can be replaced with injectors (not shown) configured in the wall of cylinder bore 210.

With the techniques disclosed herein a gaseous fuelled internal combustion engine can perform better than a compression ignition diesel engine of like displacement. This allows gaseous fuelled internal combustion engines to be downsized with respect to displacement compared to previous internal combustion engines without sacrificing power and torque. In some situations the number of cylinders can be reduced which leads to even greater reductions in engine size and increases in fuel economy.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A combustion apparatus for a gaseous fuelled internal combustion engine comprising:
   a combustion chamber defined by a cylinder bore, a cylinder head and a piston reciprocating within said cylinder bore, said piston comprising a concave piston bowl, a diameter of said cylinder bore is at least 90 mm and a ratio between said diameter to a stroke length of said piston is at most 0.95;
   at least one intake passage for delivering a charge to said combustion chamber; and
   at least one intake valve configured in said cylinder head and cooperating with said intake passage to create a predominant tumble flow motion in said combustion chamber.

2. The combustion apparatus of claim 1, wherein said ratio is at least 0.75.

3. The combustion apparatus of claim 1, wherein said diameter is less than or equal to 120 mm.

4. The combustion apparatus of claim 1, further comprising an injection valve that introduces gaseous fuel upstream from said at least one intake valve.

5. The combustion apparatus of claim 1, further comprising an ignition device disposed in said combustion chamber to assist with ignition of gaseous fuel and said charge.

6. The combustion apparatus of claim 5, wherein said ignition device is a spark plug.

7. The combustion apparatus of claim 1, wherein said tumble flow motion comprises an average tumble ratio between a range of 2 and 5.

8. The combustion apparatus of claim 1, wherein a maximum engine speed of said internal combustion engine is 2700 revolutions per minute.

9. The combustion apparatus of claim 1, wherein said cylinder bore and said piston define a swept volume between 0.8 liters and 2.5 liters.

10. The combustion apparatus of claim 1, wherein each intake valve comprises a valve member and a valve seat, said valve seat comprising a valve seat angle between 25° and 35°.

11. The combustion apparatus of claim 10, wherein
    a difference between said valve seat angle and a port angle is between a range of −5° and 5°.

12. The combustion apparatus of claim 1, wherein at least one of:
    a compression ratio of said internal combustion engine is at least 11 to 1; and
    said compression ratio is at most 15 to 1.

13. The combustion apparatus of claim 1, further comprising an intake manifold, said intake manifold comprising:
    a first distribution chamber in fluid communication with an air intake of said internal combustion engine;
    a second distribution chamber in fluid communication with said at least one intake passage; and
    a diffuser fluidly connecting said first and second distribution chambers.

14. The combustion apparatus of claim 4, wherein said at least one intake passage is a first intake passage and a second intake passage and said at least one intake valve is a first intake valve and a second intake valve; further comprising a flow divider in fluid communication with said injection valve to receive gaseous fuel and with said first and second intake passages to deliver gaseous fuel received from said injection valve.

15. The combustion apparatus of claim 14, wherein said flow divider comprises a body having a bore and a pair of conduits, said bore in fluid communication with said injection valve and each conduit in fluid communication with said bore and with a respective one of said first and second intake passages.

16. The combustion apparatus of claim 1, wherein said internal combustion engine comprises an engine block and an intake manifold, and said at least one intake passage is a first intake passage and a second intake passage, further comprising six bolts arranged around said cylinder bore for retaining said cylinder head to said engine block, said first and second intake passages extending from said intake manifold along respective sides of one of said bolts towards said combustion chamber.

17. The combustion apparatus of claim 16, further comprising an EGR valve for selectively supplying exhaust gases to said intake manifold.

18. The combustion apparatus of claim 17, where said exhaust gases are cooled.

19. The combustion apparatus of claim 16, further comprising a throttle valve for variably supplying air to said intake manifold.

20. The combustion apparatus of claim 19, wherein said throttle valve is commanded to maintain a stoichiometric gaseous fuel-air mixture within a predetermined tolerance when said gaseous fueled internal combustion operates.

* * * * *